(12) United States Patent
Odaohhara

(10) Patent No.: US 7,057,309 B2
(45) Date of Patent: Jun. 6, 2006

(54) ELECTRICAL APPARATUS, COMPUTER, POWER SWITCHING UNIT, AND POWER SWITCHING METHOD

(75) Inventor: Shigefumi Odaohhara, Yamato (JP)

(73) Assignee: Lenovo ( Singapore) Pte. Ltd., Singapore (SG)

( * ) Notice: Subject to any disclaimer, the term of this patent is extended or adjusted under 35 U.S.C. 154(b) by 561 days.

(21) Appl. No.: 10/282,826

(22) Filed: Oct. 29, 2002

(65) Prior Publication Data

US 2003/0085626 A1    May 8, 2003

(30) Foreign Application Priority Data

Oct. 29, 2001    (JP) .............................. 2001-331506

(51) Int. Cl.
*H02J 7/00*    (2006.01)
(52) U.S. Cl. .......................... 307/80; 307/70; 307/150; 320/150
(58) Field of Classification Search ................. 307/80, 307/70, 23, 150; 320/150
See application file for complete search history.

(56) References Cited

U.S. PATENT DOCUMENTS

| 5,309,080 A | * | 5/1994 | Odendahl et al. ........... 320/150 |
| 5,754,868 A | * | 5/1998 | Yamamoto et al. ......... 713/300 |
| 5,818,200 A | * | 10/1998 | Cummings et al. ......... 320/116 |
| 5,825,100 A | * | 10/1998 | Kim ............................. 307/66 |
| 6,357,011 B1 | * | 3/2002 | Gilbert ....................... 713/300 |

FOREIGN PATENT DOCUMENTS

| GB | 2271680 A | * | 4/1994 |
| JP | 04-67733 |  | 6/1992 |
| JP | 05176474 A | * | 7/1993 |
| JP | 07-147166 |  | 6/1995 |
| JP | 08-106344 |  | 4/1996 |
| JP | 2001-157378 |  | 6/2001 |

OTHER PUBLICATIONS

English language abstract for JP 05176474 A Jul. 1993 Japam Arai, Yoshihiro.*

* cited by examiner

*Primary Examiner*—Stephen W. Jackson
*Assistant Examiner*—Brett Squires
(74) *Attorney, Agent, or Firm*—Carlos Munoz-Bustamante; Dillon & Yudell LLP

(57) ABSTRACT

An electrical apparatus including an AC adapter 51; a battery 52 that repeats charging and discharging to power the apparatus; an AC/DC enable circuit 61 that switches between stop and start of power source from the AC adapter 51 to the body; a charger utilization circuit 62 that charges an output capacitor (Cout) of a charger 60 while the power source from the AC adapter 51 stops; and a battery detection circuit 63 that detects disconnection of the battery 52. If the battery 52 is disconnected from the body and the battery detection circuit 63 detects the disconnection while the power source from the AC adapter 51 stops and the body is powered by the battery 52, the AC/DC enable circuit 61 starts power source to the body while the body is powered by the output capacitor (Cout).

5 Claims, 4 Drawing Sheets

ELECTRICAL APPARATUS, COMPUTER, POWER SWITCHING UNIT, AND POWER SWITCHING METHOD

CROSS REFERENCE TO RELATED APPLICATIONS

Applicant claims the foreign priority benefits under 35 U.S.C. 119 of Japanese Patent Application 2001-331506 filed Oct. 29, 2001. This Japanese Patent Application and its translation are incorporated herein by reference.

BACKGROUND OF THE INVENTION

The present invention relates to electrical apparatuses, etc. provided with a battery that charges, then discharges. More particularly, the present invention relates to electrical apparatuses, etc. intended for improving usability of the battery.

In addition to commercial power sources that supply power directly, batteries that can be reused through charging/discharging (power accumulators, secondary batteries, and primary batteries) are used to power information terminals such as by laptop personal computers (PCs), personal devices such as as a PDA (Personal Digital Assistant), and various kinds of electrical apparatus such as portable audio devices, video cameras, etc. Nickel hydrogen batteries (NiMH batteries) and nickel cadmium batteries (Ni—Cd batteries) are comparatively large in capacity and low in price are employed in such applications. There are also other types of batteries such as lithium ion batteries which are higher in energy density per unit weight than nickel cadmium batteries, as well as lithium polymer batteries which use solid polymer without using liquid electrolyte.

The nickel hydrogen batteries and the nickel cadmium batteries, however, are degraded in charging capacity when they are frequently charged half-way and then discharged incompletely. As a result, the so-called "memory effect" occurs. The "memory effect" is a phenomenon wherein continuous operating time of the battery is reduced. In addition, for an intelligent battery provided with an internal CPU, when half-way charging and incomplete discharging are repeated, errors are accumulated in such measured values as the residual capacity of the battery, thereby making correct measurement difficult. In recent years, however, there have appeared a device that can eliminate the "memory effect" from intelligent batteries with a refreshing function that discharges the battery completely even when the subject apparatus is connected to an AC adapter (power source). A technique that refreshes batteries to eliminate errors from measured values is now under examination for intelligent batteries.

Furthermore, "peak shifting" has also been required in recent years to reduce the peak power consumption during a time in which power consumption rises significantly, for example, during a summer afternoon in which power consumption increases due to the operation of air conditioners. When electrical apparatus are configured so as to be powered only from batteries when power from commercial sources via an AC adapter stops in such a much power consuming time zone, such the peak time power consumption (in time zones of extremely high power demand) will be more reduced.

However, the power line from the commercial power source is disconnected completely while the battery is refreshed and the peak-shifting is done with the above-described technique. In the case where the user disconnects the battery by mistake in such a state, no power is supplied to the computer system, thereby the system will be shut down. Especially, if the computer system is shut down suddenly in such a computer as a lap-top PC, for example, the current task cannot be recovered and the data in the processing will be lost. In addition, the hardware in the computer system might be damaged.

Under such circumstances, it is an object of the present invention to prevent an electrical apparatus connected to a battery from shut-down even when the battery is disconnected while the power line from the physically connected commercial power source is disconnected (circuit disconnection) and the battery powers the body.

SUMMARY OF THE INVENTION

In order to achieve the above objects, the present invention provides an electrical apparatus configured so as also to connect a battery that charges, then discharges to power a body that is powered by a power source connected to a commercial power source. The electrical apparatus comprises a battery power supplying unit that stops power source from the power source to the body to enable the battery to power the body; a power accumulating unit that accumulates a power while the battery powers the body and powers the body when the battery is disconnected from the body; and a power source starting unit that starts power source from the power source to the body while this power accumulating unit powers the body.

The electrical apparatus of the present invention can further include a recognizing unit that recognizes disconnection of this battery from the body. And, based on the recognition by this recognizing unit, the power source starting unit starts power source from the power source to the body.

This battery power supplying unit stops power from the power source to the body according to a refresh command issued to the battery or when the peek shifting function is executed to suppress power consumption at a peak time of the power source from the commercial power source.

On the other hand, a electrical apparatus of the present invention comprises a body that consumes a power; a power source that supplies a power received from a commercial power source to this body; a battery that charges, then discharges to power the body; a first circuit that switches between start and stop of power source from the power source to this body; a second circuit that accumulates a power in a predetermined capacitor while the first circuit stops power source from the power source; and a third circuit that detects disconnection of the battery from the body. When power source from the power source stops and the battery powers the body, then, the third circuit recognizes disconnection of the battery from the body, the first circuit starts power source from the power source while the power accumulated in the capacitor is supplied to the body.

Furthermore, an electrical apparatus of the present invention is configured in another way to include a computer system; an AC adapter connected to a commercial power source and enabled to power a computer system; a battery that charges, then discharges to power the computer system; a switching unit that turns on/off power source from the AC adapter to the computer system; and a capacitor that accumulates electric charges while the battery is refreshed. This switching unit, if the battery is disconnected from the computer system while the battery is refreshed, turns on the off-state power source from the AC adapter to the computer system while the power accumulated in the capacitor is supplied to the computer system.

On the other hand, the present invention also provides a computer configured so as to enable such a power source as an AC adapter, etc. to power a computer system and be connected to a battery that repeats charging and discharging to power the computer system. The computer comprises a first FET that switches between start and stop of power source from a power source to the computer system; a capacitor that accumulates electric charges; and a second FET that accumulates electric charges when the first FET stops power source from the power source and the battery powers the computer system. When power source from the power source stops and the battery powers the computer system, then the battery is disconnected from the computer system, the capacitor supplies the accumulated power to the computer system and the first FET is switched to start power source from the power source to the computer system.

From another point of view, a computer of the present invention comprises a refreshing unit that refreshes the battery; a power supplying unit that supplies its accumulated power to the computer system when the battery that is being refreshed by the refreshing unit is disconnected from the computer system; and a supply starting unit that starts power source from the power source to the computer system while this power supplying unit powers the computer system.

On the other hand, the present invention can also be identified as a power source switching circuit that switches between a power source connected to a commercial power source and a battery that repeats charging and discharging to power a computer system. This power source switching circuit includes a battery power supplying unit that stops power source from the power source to the computer system and enables the battery to power the computer system; a power accumulating unit that accumulates a power while the battery powers the computer system and supplies the accumulated power to the computer system when the battery is disconnected from the computer system; and a power source starting unit that starts power source from the power source to the computer system while the power accumulating unit supplies the accumulated power to the computer system.

Furthermore, the present invention may be identified as a power source switching method that switches between a power source connected to a commercial power source and a battery that repeats charging and discharging to power a body. The method includes a step of enabling the battery to power the body while power source from the power source stops; a step of accumulating a power in a predetermined capacitor while the battery powers the body; a step of enabling the capacitor to power the body when the battery that powers the body is disconnected from the body; and a step of starting power source from the power source to the body while the capacitor powers the body.

Furthermore, a power source switching method of the present invention may also be configured to include a step of powering a computer system from the battery when a power line from an AC adapter connected to a commercial power source is shut off (circuit disconnection); and step of, when the battery that is active is disconnected, connecting the power line from the AC adapter (circuit connection) while voltage drop of the power source is suppressed. At this time, if a power is accumulated in an output capacitor of a charger that charges the battery so that the output capacitor can supply the accumulated power to the computer system thereby suppressing voltage drop of the power source, the computer system can be prevented from shut-down even when the active battery is disconnected from the computer system.

DESCRIPTION OF THE ILLUSTRATIVE EMBODIMENTS

The present invention will be described in detail with reference to the embodiments shown in the accompanying drawings.

Figure 1:
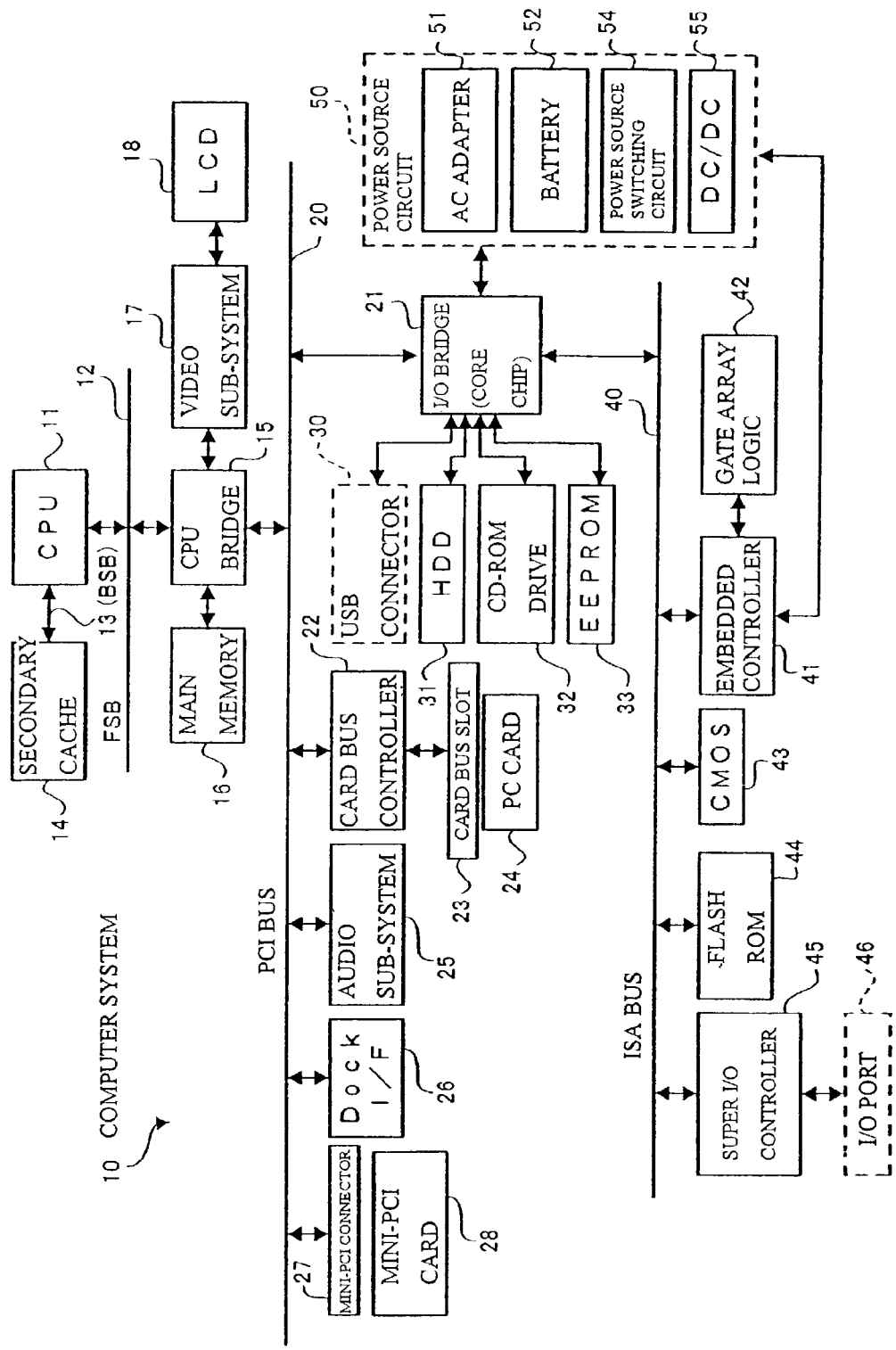
FIG. 1 is a hardware block diagram of a computer system in an embodiment of the present invention.

FIG. 1 shows a hardware block diagram of a computer system 10 in a preferred embodiment of the present invention. A computer system 10 is configured as a lap-top PC (lap-top personal computer) in which a predetermined OS is installed by conforming to the OADG (Open Architecture Developer's Group specifications.

In the computer system 10 shown in FIG. 1, a CPU 11 executes various programs including a utility program under the control of the OS. The CPU 11 connects each of the components of the computer system via three buses; an FSB (Front Side Bus) 12, which is a system bus; a PCI (Peripheral Component Interconnect) bus 20 used for fast I/O devices; and an ISA (Industry Standard Architecture) bus 40 used for slow I/O devices. This CPU 11 stores program code and data in a cache memory so as to speed up the processing. In recent years, in addition to an SRAM of about 128K bytes integrated in the CPU 11 and used as a primary cache, the CPU 11 connects a secondary cache 14 of about 512K to 2 M bytes via an exclusive BSB (Back Side Bus) 13 to provide an adequate memory capacity. The BSB 13 may be omitted and the secondary cache 14 may be connected to the FSB 12 to avoid the use of a package with many terminals and lower the manufacturing cost.

The FSB 12 and the PCI bus 20 are connected to each other via a CPU bridge (host—PCI bridge) 15 referred to as a memory/PCI chip. This CPU bridge 15 includes a memory controller that controls access to the main memory 16 and a data buffer that absorbs the difference between the data transfer rates of the FSB 12 and the PCI bus 20. The main memory 16 has an area into which executable programs are read from the CPU 11 and a work area in which data processed by executable programs are written. For example, the main memory 16 is composed of a plurality of DRAM chips having a standard capacity of 64 MB, which can be expanded up to 320 MB. The executable programs are, for example, various drivers used to operate the OS, as well as the hardware of peripheral devices, application programs used for specific business purposes, and firmware items such as the BIOS (Basic Input/Output System), etc. stored in a flash ROM 44 (to be described later).

A video sub-system 17 executes video-related functions and includes a video controller. This video controller processes drawing instructions received from the CPU 11 and writes processed drawing information in a video memory. The video controller also reads drawing information from the video memory and outputs the information to a liquid crystal display (LCD) 18 as drawing data.

The PCI bus 20 can transfer data comparatively fast. The PCI bus 20 is standardized in accordance with the specifications (data bus width: 32 or 64 bits, max. operating frequency: 33 MHz or 66 MHz, max. data transfer rate: 132 MB/sec or 528 MB/sec). This PCI bus 20 is connected to the I/O bridge 21; the card bus controller 22; an audio subsystem 25; the docking station interface (Dock I/F) 26; and the mini-PCI connector 27 respectively.

The card bus controller 22 is used exclusively to connect bus signals of the PCI bus 20 to the interface connector (card bus) of the card bus slot 23. A PC card 24 can be loaded into card bus slot 23. The docking station interface 26 is a hardware item used to connect a docking station (not shown), which is an expansion unit. When a lap-top PC is connected to the docking station, the various hardware items connected to an internal bus of the docking station are connected to the PCI bus 20 via the docking station interface 26. The mini-PCI card 28 is connected to the mini-PCI connector 27.

The I/O bridge 21 functions as a bridge between the PCI bus 20 and the ISA bus 40. The I/O bridge 21 also functions as a DMA controller, a programmable interruption controller (PIC), a programmable interval timer (PIT), an IDE (Integrated Device Electronics) interface, a USB (Universal Serial Bus), and an SMB (System Management Bus) interface. The I/O bridge 21 also includes a built-in real time clock (RTC).

The DMA controller executes data transfer between each of such peripheral devices as an FDD, etc. and the main memory 16. The PIC enables a predetermined program (interrupt handler) to run in response to each interrupt request (IRQ) received from peripheral devices. The PIT generates time signals at predetermined cycles. The IDE interface connects the IDE hard disk drive (HDD) 31, as well as the CD-ROM drive 32 via an ATAPI (AT Attachment Packet Interface). Instead of this CD-ROM drive 32, another type IDE unit such as a DVD (Digital Versatile Disc) drive may be connected to the IDE interface. External storage units such as the HDD 31, the CD-ROM drive 32, etc. are housed in a place referred to as a "media bay" or "device bay" provided in the lap-top PC. Those external storage units provided as standard may be replaced with such other devices as an FDD, a battery pack, etc.

The I/O bridge 21 is also provided with a USB port. This USB port is connected to a USB connector 30 provided, for example, on the laptop PC body. The I/O bridge 21 is also connected to the EEPROM 33 via the SM bus. This EEPROM 33 is a non-volatile memory used to hold such information as user registered passwords, supervisor passwords, serial numbers of products, etc. The data in this non-volatile memory can be rewritten electrically.

Furthermore, the I/O bridge 21 is connected to the power source circuit 50. The power source circuit 50 is provided with, for example, an AC adapter 51 connected to a 100 VAC commercial power source and enabled for AC/DC conversion; a battery (secondary battery) 52 consisting of nickel batteries, nickel cadmium batteries or the like that can be reused by repetitive of charging/discharging; a Power Source Switching Circuit 54 that charges the battery 52 and switches between power source paths from the AC adapter 51 and from the battery 52; and such circuits of DC/DC converter (DC/DC) 55 that generates constant DC voltages of +15V, +5V, +3.3V, etc. used for the computer system 10. This battery 52 may be a so-called dumb battery that is not provided with an internal CPU or an intelligent battery provided with an internal CPU and enabled to communicate with an embedded controller 41 (to be described later) by conforming to, for example, the SBS (Smart Battery System) specifications. In this embodiment, the battery 52 is configured as a battery pack and enabled to be removably attached to the lap-top PC body.

On the other hand, in the core chip of the I/O bridge 21, an internal register used to manage the power state of the computer system 10 and a logic (state machine) used to manage the power state of the computer system 10 including the operation of this internal register are provided. This logic sends/receives various signals to/from a power source circuit 50 to recognize the actual power source state of the computer system 10 from the power source circuit 50. According to the commands from this logic, the power source circuit 50 controls the power source to the computer system 10.

The ISA bus 40 is slower than the PCI bus 20 in data transfer rate (for example, the bus width: 16 bits, the max. data transfer rate: 4 MB/sec). This ISA bus 40 connects the embedded controller 41 to the gate array logic 42, the CMOS 43, the flash ROM 44, and the Super I/O controller 45. In addition, this ISA bus 40 also connects such peripheral devices as the keyboard mouse controller that is comparatively slow in operation. The Super I/O controller 45 connects an I/O port 46 to control the FDD, the input/output (PIO) of parallel data via a parallel port, and the input/output (SIO) of serial data via a serial port.

The embedded controller 41 controls a keyboard (not shown). In addition, embedded controller 41 is connected to power source circuit 50 and plays a partial role in the management of the power source together with a built-in Power Management Controller (PMC) and the gate array logic 42.

Next, a description will be made for the power switching circuit 45 in a characteristic configuration in this embodiment.

Figure 2:
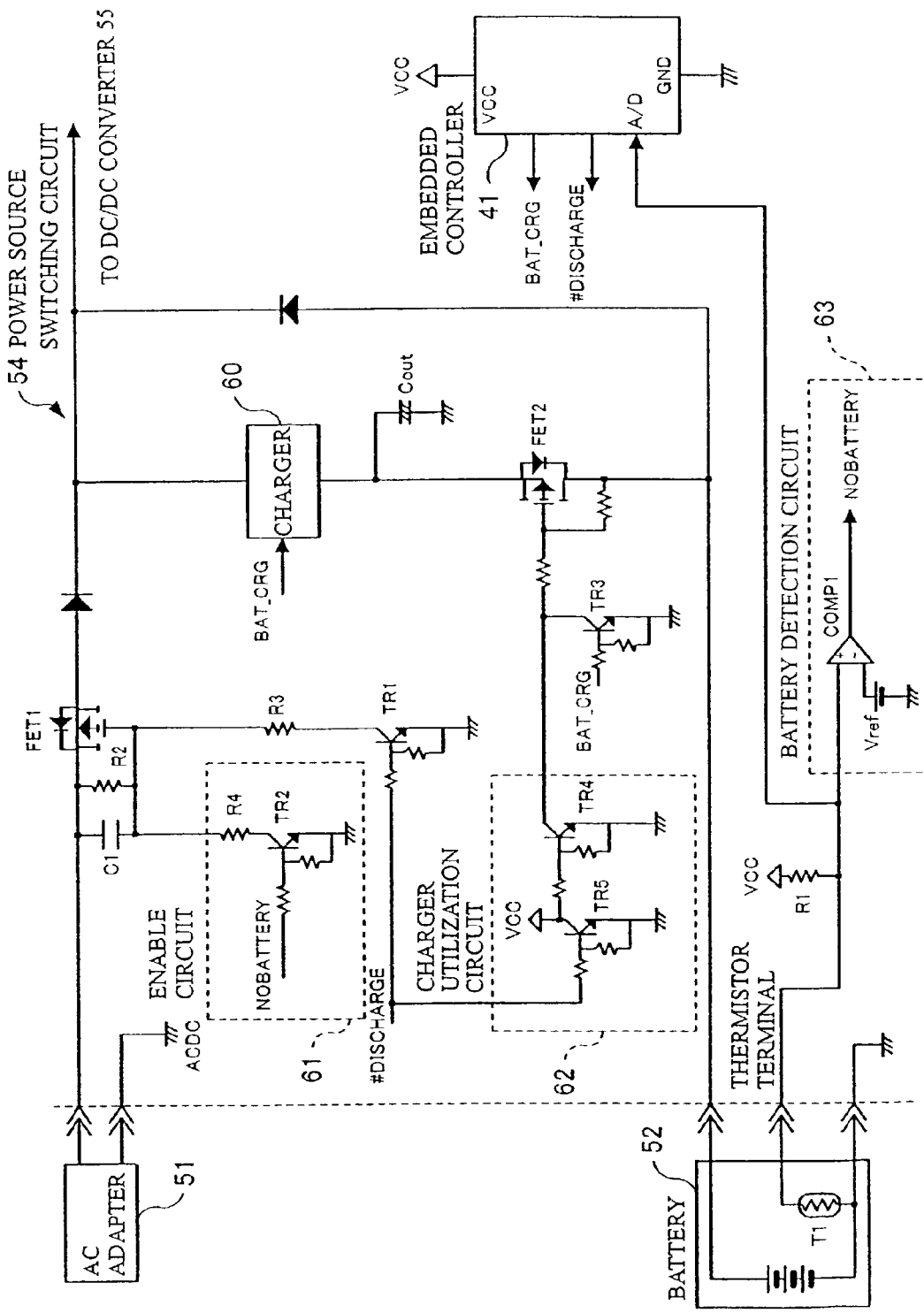
FIG. 2 is a block diagram of a power source switching circuit in the embodiment of the present invention.

FIG. 2 shows a block diagram of the power switching circuit 54 in this embodiment. The power switching circuit 54 switches between the AC adapter 51 and the battery 52 according to the output from the embedded controller 41. The power output switched by this power switching circuit 54 is supplied to the computer system circuit via a DC/DC converter 55.

The power switching circuit 54 shown in FIG. 2 includes a charger 60 used to charge the battery 52, an AC/DC Enable Circuit 61 used to turn on/off the power from AC adapter 51, a Charger Utilization Circuit 62 used to accumulate electric charge in an output capacitor Cout of the charger, and a Battery Detection Circuit 63 used to recognize disconnection of the battery 52. This output capacitor Cout of the charger is usually used to prevent variations in the charging voltage, thereby supplying a smoothed constant voltage to the battery 52. In this embodiment, the computer system is prevented from shut-down by using this output capacitor (Cout) as the power accumulating unit that supplies a temporary power to the computer system.

The computer system 10 in this embodiment can execute the so-called "refreshing function" of the battery 52. As described above, generally, for a nickel hydrogen battery or nickel cadmium battery, its apparent charging capacity goes down when half-way charging and incomplete discharging are repeated. As a result, the well-known "memory effect" occurs in the battery. The "memory effect" is a phenomenon that shortens the continuous utilization time of the battery. To prevent such a "memory effect", the system prompts the user to "refresh" the battery even when the computer system 10 is connected to AC adapter 51 such that the memory effect occurs in battery 52 while the number of incomplete charging/discharging times are being counted (for example, when the count reaches 20 to 30 or more times). The "refresh" means complete discharging of a battery 52 by powering the computer system. For example, the utility program executed by the CPU 11 of the computer system 10 shown in FIG. 1 displays a message to prompt the user to start the "refreshing" on the screen of the LCD 18, so that the user inputs the refresh command to execute the refreshing in response to the prompt message.

The computer system 10 in this embodiment can also execute the "peak shifting function" (to reduce the peak power consumption). This function is to avoid power utilization from the commercial power source during a time in which the power consumption increases dramatically, for example, in the afternoon in summer. In order to meet the above requirement, the "peak shifting function" stops the power source (from the AC adapter 51) from the commercial power source via a power line at a fixed time in a time in which the power consumption increases dramatically according to the user set value, with a program installed in the system, or another similar unit, for example, in the afternoon in summer, thereby starting the power source from the battery 52. This function can perform the same operation as the refreshing at predetermined intervals (for example, every two hours).

In FIG. 2, when the battery 52 composed of, for example, nickel hydrogen batteries, is refreshed (for example, when the peak shifting function is executed) as described above, the embedded controller 41 outputs a LOW level #DISCHARGE signal to turn off the FET (Field Effect Transistor) 1, thereby stopping the power from AC adapter 51 and starting the power from battery 52 to the computer system. In the case where the user disconnects the battery 52 by mistake in this state (when in refreshing), a conventional phenomenon that no power source is available occurs and the computer system is shut down before the embedded controller 41 detects disconnection of the battery 52. In this embodiment, however, because the computer system 10 is provided with the AC/DC enable circuit 61, the charger utilization circuit 62, and the battery detection circuit 63, the computer system is prevented from such shut-down. Even when the user disconnects the battery 52 by mistake while the battery 52 is refreshed (or when the peak shifting function is executed), the battery detection circuit 63 detects the battery disconnection of the battery 52 and switches the power source to the AC adapter 51 immediately. This is why the computer system can be prevented from shut-down. As a result, the refreshing function usability is improved.

The battery detection circuit 63 uses a thermistor terminal that detects the temperature in the battery 52 to detect disconnection of the battery 52 (from the computer system). The voltage at the junction between the thermistor (T1) of the battery 52 and the resistor (R1) of the computer system is reduced. For example, when the battery 52, which is a battery pack, is connected to the computer system, the voltage is about 3.0V (VCC=5V). On the other hand, when the battery 52 (battery pack) is disconnected from the computer system, the thermistor (T1) is not connected. The voltages at both ends of the resistor (R1) thus become 5V. This voltage is inputted to the plus (+) terminal of the comparator (COMP1) of the battery detection circuit 63 to be compared with a reference voltage of the inverting (−) terminal. Consequently, when battery 52 is connected to the computer system, comparator COMP1 outputs a LOW level signal, while it outputs a HIGH level signal when the battery 52 is disconnected from the computer system.

The charger utilization circuit 62 turns on the FET2 connected to the output of the charger 60 to charge the output capacitor Cout of the charger 60 forcibly while the battery 52 is refreshed (or when the peak shifting function is executed). When refreshing, the embedded controller 41 drives the #DISCHARGE signal into the LOW level, so that the transistor (TR5) is turned off and the transistor (TR4) is turned on. When the FET2 is turned on, the output capacitor (Cout) of the charger 60 is charged forcibly. Most of the power source to the computer system is output by the output capacitor (Cout) until the AC adapter 51 is connected to the computer system after the battery 52 is disconnected.

In AC/DC Enable Circuit 61, transistor TR2 and FET1 are turned ON when the NOBATTERY signal of Battery Detection Circuit 63 is driven to the HIGH level (in which state, battery 52 is disconnected). As a result, AC adapter 51 powers the system. Usually, FET1 can also prevent a rush current (an excessive current that flows, for example, when AC adapter 51 is connected) and a large time constant value is set by capacitor C1 and resistor R3 to establish the start-up time when FET1 is turned ON. To speed up the switching time from battery 52 to AC adapter 51, the value of resistor R4) is set far smaller than that of resistor R3.

Next, the whole switching operation will be described. The normal operation of the computer system is set to assume NOBATTERY=LOW and #DISCHARGE=HIGH when both the AC adapter 51 and the battery 52 are connected to the computer system. Thus, the FET1 is turned on, thereby the AC adapter 51 powers the computer system. When the user refreshes the battery 52 with the utility program, the embedded controller 41 outputs #DISCHARGE=LOW to turn OFF the FET1, thereby the power from AC adapter 51 stops. At this time, BAT_CRG=LOW is set and the operation of the charger 60 is stopped. However, because the charger utilization circuit 62 turns on the FET2, the output capacitor (Cout) of the charger 60 is charged.

The electric charges accumulated in this output capacitor (Cout) are used to power the computer system when the battery 52 is disconnected until the AC adapter 51 is connected to the computer system. In this state, because the battery 52 is connected to the computer system, the battery detection circuit 63 outputs a low NOBATTERY=LOW signal, and the transistor (TR2) of the AC/DC enable circuit 61 is turned off.

In the case where the user disconnects the battery 52 by mistake while the battery is refreshed, the thermistor (T1) set in the battery 52 is disconnected, so that the comparator (COMP1) outputs a NOBATTERY=HIGH signal. In the AC/DC enable circuit 61, the transistor (TR2) is turned on, thereby the FET1 is turned on. Thus, the AC adapter 51 feedss power to the computer system. The embedded controller 41 then detects disconnection of the Battery 52 during the refresh time and the utility program executed in the CPU 11 can notify the user of the mistake (stop the refreshing), for example, by displaying a warning message on the screen of the LCD 18.

As described above, according to this embodiment, it is possible to prevent the computer system from shut-down and to notify the user of such a mistake, thereby improving the usability of the computer system even in a case in which the computer system has been shut down.

Figure 3:
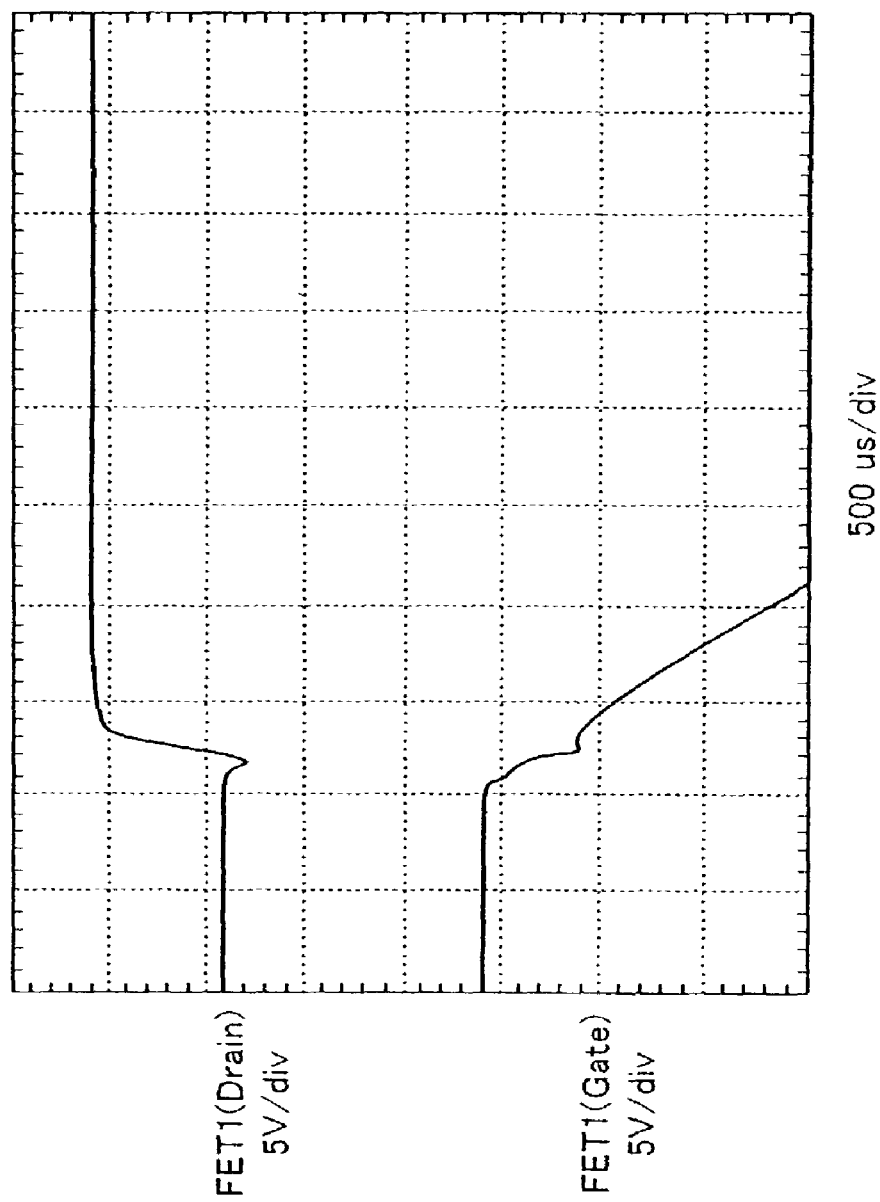
FIG. 3 shows waveforms observed when the power source is switched by the power source switching circuit in a lap-top PC in the embodiment of the present invention.

FIG. 3 shows the observed waveforms of FET1 when the Power Source Switching Circuit 54 switches power. The upper waveform shows FET1 drain voltage (voltage supplied to the computer system) and the lower waveform shows the gate voltage used to switch FET1 ON/OFF. These waveforms show FET1 turned ON at approximately half of the gate voltage drop, thereby switching to the AC adapter powered mode. Because it takes about 100 ms for the power to switch, the voltage drops by about 1V during switching.

This 1V drop hardly affects the operation of the computer system, but the voltage drop can be reduced if the values of capacitor C1 and resistor R4 are adjusted.

Figure 4:
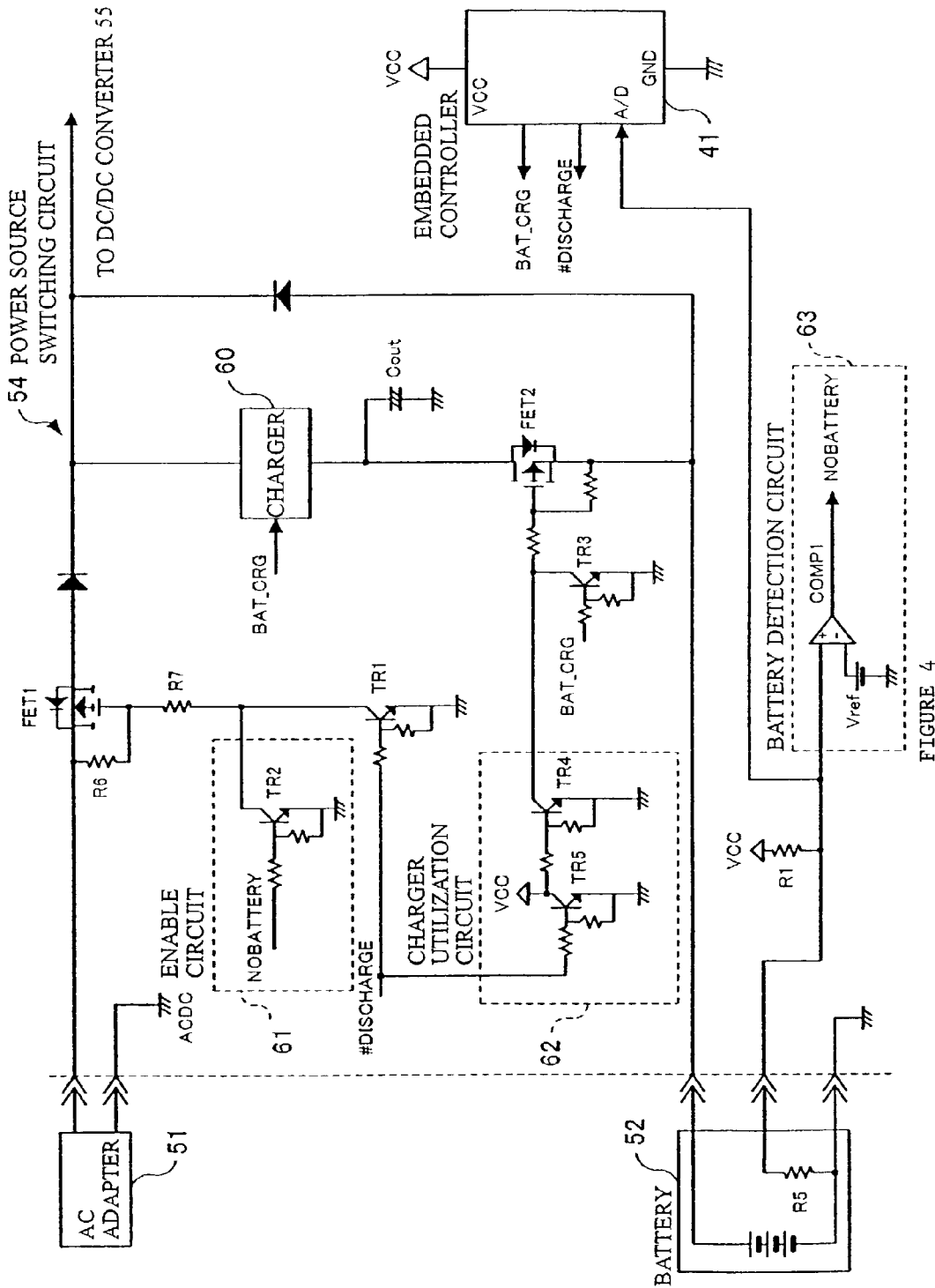
FIG. 4 is another block diagram of the power source switching circuit shown in FIG. 2.

FIG. 4 illustrates another embodiment of the Power Source Switching Circuit 54 of FIG. 2. In the embodiment of FIG. 4, capacitor C1, as well as resistors R2 and R3 of FIG. 2 are replaced with resistors R6 and R7, and resistor R4 is removed from the AC/DC Enable Circuit 61. Thus, in the Power Source Switching Circuit 54 of FIG. 2, the rush current preventive function makes it possible to set the startup time when Power Source Switching Circuit 54 is turned ON by adjusting the time constant of capacitor C1 and resistor R3. On the other hand, to shorten the time to switch from battery 52 to AC adapter 51, the value of resistor R4 has been set significantly less than that of resistor R3. In the second embodiment of FIG. 4, however, the transition time to start the power flowing from AC adapter 51 to the system housing when battery 52 is disconnected is set very short, and the computer system is not provided with the rush current preventive function.

Next, the operation of the circuit of FIG. 4 will be described. Just like the circuit of FIG. 2, FET2 is turned ON to charge the output capacitor Cout of charger 60 when battery 52 is refreshed. If battery 52 is disconnected during refresh, the voltage at the connection point between the resistors R5 and R1 exceeds the reference voltage Vref, so that the NOBATTERY signal output from comparator COMP1 goes HIGH. With NOBATTERY=HIGH, transistor TR2 of AC/DC Enable Circuit 61 is turned ON, which activates FET1. As a result, power from AC adapter 51 is feed to the computer system, which is temporarily powered by output capacitor Cout of charger 60 until FET1 is turned ON. When battery 52 is an intelligent battery, the output terminal of resistor R5 is a standard detection terminal including an SBS. However, resistor R5 may also be provided in a dumb battery.

If the required circuit response time is calculated by assuming that the allowable voltage drop of the power line is 1V, the current consumption of the computer system is 2 A, and the capacitance of output capacitor Cout is 22 mF, the response time is calculated as follows.

Response speed $t=CV/I=22(mF)\times1(V)/2(A)=11$ msec

Generally, in an electric device such as computer system 10, AC adapter 51 is provided outside the housing of the computer system. However, AC adapter 51 may be provided inside the housing of the computer system or other electrical apparatus. The system housing may be configured to include a power input connector. When the AC adapter 51 is provided as an external unit, this power input connector is configured to connect to a mating connector at one end of a cable, the other end of which is connected to AC adapter 51. When AC adapter 51 is provided in the system housing, the power input connector is configured to connect directly to a commercial power source. Battery 52 is usually configured as a battery pack so that it can be easily removed from the computer system.

In this embodiment, if the user inadvertently disconnects battery 52 while the computer system is being powered only by the battery and the output power from the AC adapter 51 is disconnected (FET1=OFF) such as, for example, during a refresh operation, battery detection circuit 63 detects the open state of the detection terminal of battery 52 and connects (FET1=ON) the power line of AC adapter 51 to the DC/DC converter 55. If the power source voltage drops to the reference value or below while the circuit is switching power sources, a malfunction in the DC/DC converter 55 may occur. To avoid this problem, the computer system is temporarily powered by the output capacitor Cout of charger 60 to minimize the voltage drop until the AC/DC Enable Circuit 61 can switch FET1 ON to feed power from the AC adapter to the DC/DC converter.

Although a lap-top PC has been used to describe various embodiments of the present invention, the invention may also be practiced in other electrical apparatus without departing from the spirit of the invention. In addition, although it is preferred to attach battery 52 to the system housing, for example, as a battery pack, there is no need to physically attach the battery to the system housing; as it may be connected to the system via a cable.

As described above and according to the present invention, it is possible to power a computer system from a battery while the system is physically connected to a commercial power source, and to prevent the system from shut-down even when the battery is inadvertently disconnected from the system while the power from the commercial power source is internally disconnected (e.g., FET1=OFF).

I claim:

1. A power supply for an electrical apparatus, said power supply comprising:
   an input for receiving power from a commercial power source;
   an output for delivering power to the electrical apparatus;
   a switch for selectively coupling said input to said output;
   a removable battery coupled to said output;
   a thermistor coupled to said removable battery, said thermistor having a thermistor output that is coupled to a thermistor terminal when said removable battery is coupled to said power supply;
   a resistor, said resistor having a first end connected to a voltage source set at a first voltage level, and said resistor having a second end connected to said thermistor terminal, wherein a thermistor terminal voltage at said thermistor terminal equals said first voltage level when said removable battery is removed from said power supply, and wherein said thermistor terminal voltage is changed by said thermistor when said removable battery is coupled to said power supply;
   a circuit for detecting removal of said removable battery and for activating said switch to couple said input to said output upon detection of the removal of said removable battery, wherein said detecting removal of said removable battery is performed by a comparator in said circuit for detecting removal of said removable battery, said comparator being capable of comparing said thermistor terminal voltage to a reference voltage that is set to said first voltage level, and wherein said comparator outputs a "no battery" signal when said thermistor terminal voltage and said reference voltage are equal due to said removable battery being removed; and
   a capacitive circuit for storing electrical energy, said capacitive circuit being coupled to said output, said capacitive circuit temporarily supplying power to said output in response to the removal of said removable battery, and wherein said capacitive circuit is charged only while said removable battery is being refreshed by a process that includes completely discharging said removable battery to avoid memory effect in said removable battery.

2. The power supply of claim 1, wherein said removable battery is used to supply power from said power supply to said electrical apparatus only during peak power consumption periods during which a power demand on said commercial power source exceeds a predetermined level.

3. An electrical apparatus having a power supply, said power supply comprising:
   an input for receiving power from a commercial power source;
   an output for delivering power to the electrical apparatus;
   a switch for selectively coupling said input to said output;
   a removable battery coupled to said output;
   a thermistor coupled to said removable battery, said thermistor having a thermistor output that is coupled to a thermistor terminal when said removable battery is coupled to said power supply,
   a resistor, said resistor having a first end connected to a voltage source set at a first voltage level, and said resistor having a second end connected to said thermistor terminal, wherein a thermistor terminal voltage at said thermistor terminal equals said first voltage level when said removable battery is removed from said power supply, and wherein said thermistor terminal voltage is changed by said thermistor when said removable battery is coupled to said power supply,
   a circuit for detecting removal of said removable battery and for activating said switch to couple said input to said output upon detection of the removal of said removable battery, wherein said detecting removal of said removable battery is performed by a comparator in said circuit for detecting removal of said removable battery, said comparator being capable of comparing said thermistor terminal voltage to a reference voltage that is set to said first voltage level, and wherein said comparator outputs a "no battery" signal when said thermistor terminal voltage and said reference voltage are equal due to said removable battery being removed; and
   a capacitive circuit for storing electrical energy, said capacitive circuit being coupled to said output, said capacitive circuit temporarily supplying power to said output in response to the removal of said removable battery, and wherein said capacitive circuit is charged only while said removable battery is being refreshed by a process that includes completely discharging said removable battery to avoid memory effect in said removable battery.

4. The electrical apparatus of claim 3, wherein said removable battery is used to supply power from said power supply to said electrical apparatus only during peak power consumption periods during which a power demand on said commercial power source exceeds a predetermined level.

5. A power supply for an electrical apparatus, said power supply comprising:
   an input for receiving power from a commercial power source;
   an output for delivering power to the electrical apparatus;
   a switch for selectively coupling said input to said output;
   a removable battery coupled to said output;
   a thermistor coupled to said removable battery, said thermistor having a thermistor output that is coupled to a thermistor terminal when said removable battery is coupled to said power supply;
   a resistor, said resistor having a first end connected to a voltage source set at a first voltage level, and said resistor having a second end connected to said thermistor terminal, wherein a thermistor terminal voltage at said thermistor terminal equals said first voltage level when said removable battery is removed from said power supply, and wherein said thermistor terminal voltage is changed by said thermistor when said removable battery is coupled to said power supply; and
   a circuit for detecting removal of said removable battery and for activating said switch to couple said input to said output upon detection of the removal of said removable battery, wherein said detecting removal of said removable battery is performed by a comparator in said circuit for detecting removal of said removable battery, said comparator being capable of comparing said thermistor terminal voltage to a reference voltage that is set to said first voltage level, and wherein said comparator outputs a "no battery" signal when said thermistor terminal voltage and said reference voltage are equal due to said removable battery being removed; and
   a capacitive circuit for storing electrical energy, said capacitive circuit being coupled to said output, said capacitive circuit temporarily supplying power to said output in response to the removal of said removable battery, and wherein said capacitive circuit is charged only during peak power consumption periods during which a power demand on said commercial power source exceeds a predetermined level.

* * * * *